Patented Oct. 12, 1943

2,331,496

UNITED STATES PATENT OFFICE 2,331,496

TITANIUM OXIDE PRODUCTION

Carl M. Olson, Wilmington, Del., assignor to E. I. du Pont de Nemours & Company, Wilmington, Del., a corporation of Delaware No Drawing. Application July 18, 1939, Serial No. 285,134

5 Claims. (Cl. 23—202)

This invention relates to the production of pigment-useful titanium compounds and to improved processes for manufacturing the same. More particularly, it relates to improvements in processes for producing pigment titanium oxide from hydrolyzable acid solutions of titanium.

In a more specific sense, the invention relates to improvements in processes for accelerating the hydrolysis of titanium salt solutions, particularly titanium sulfate, to obtain relatively pure titanium oxide therefrom and in increased, high yields, with ultimate production of a titanium oxide pigment of controlled and substantially uniform particle size, excellent color, texture, strength and opacity.

In the production of hydrated titanium oxide adapted for use as a pigment, acid solutions of titanium are hydrolyzed at elevated temperatures, said solutions usually resulting from mineral acid (sulfuric, hydrochloric, etc.) attack upon titaniferous ores (ilmenite, rutile, brookite, etc.). Metals other than titanium dissolve during such processing and are removed from the hydrolysis precipitate by filtration and washing. Upon further purification and subjection to calcination, said precipitate yields a finely-divided, white titanium oxide pigment which is adapted to many well-known uses. In general, the brightness of said final product is proportional to the concentration of the titanium solution at the time of hydrolysis. Besides a relatively pure, neutral tint, said pigment must meet other specifications, particularly in respect to particle size, texture, color and opacity. The number and size of the ultimate pigment particles is, in a large measure, determined by the number of colloidal nuclei used to accelerate the hydrolysis reaction.

In large scale commercial pigment titanium oxide production, concentrated rather than relatively dilute titanium solutions are preferably and more advantageously employed. Not only is it more desirable and economical to use such solutions, but the resultant pigment exhibits better color and greater hiding power than does the product from dilute solutions. When the latter type of solution is used, it is usually concentrated by evaporation or otherwise prior to hydrolysis. Concentrated solutions, however, fail to hydrolyze readily and resort to catalytic hydrolysis or seeding agents is had. Since control of particle size is of the utmost importance in the procurance of maximum pigment opacity, such hydrolysis catalyst must act not only as an accelerator, but as a nucleating agent as well.

In Blumenfeld U. S. Reissue Patent 18,854, useful methods are disclosed for accelerating the decomposition of titanium salt solutions through the initial formation in the hydrolyzing liquor of colloidal titanium hydrate. Said colloidal nuclei are formed therein by slowly and uniformly adding the titanium solution to boiling water. Unless a slow addition rate is observed, an inadequate colloidal phase results, according to the patentee, and, as a consequence, the yields of titanium oxide decrease and incomplete hydrolysis results. In such process, also, the titanium solutions must be adjusted to certain acidity and then introduced in accordance with a complicated procedure. Exact observance of the reacting conditions is therefore required and unless strictly followed a great loss in yield or production of an unfilterable colloid, or both, results. Deviations from these established conditions often occur in large scale plant operations, and, as a consequence, production of a non-uniform hydrolysis product results. Again, one is not readily enabled by such prior processes to maintain a satisfactorily complete and accurate control over nucleation. This constitutes a very important factor, because formation and dispersion of nuclei directly affect not only acceleration of the precipitation reaction but the character and particle size of the ultimate pigment titanium oxide as well.

In U. S. Reissue Patent 18,790 to Mecklenburg, titanium hydrate nuclei useful for hydrolysis procedures are obtained by combining sufficient neutralizing agent (such as an alkali hydroxide) with a titanium salt solution as will reduce the hydrogen ion concentration of said solution to a point within an acidic pH range, certain temperature conditions being then maintained. From the ensuing reaction there is produced a seed suspension of precipitated titanium hydroxide within the resultant alkali sulfate solution. While many desirable advantages are afforded by such procedures, use of caustic or acid-binding agents is required therein. This is disadvantageous not only from an economical standpoint and the cost incidental to their use, but such alkali reagents induce formation of objectionable alkali or alkali earth compounds in the precipitated titanium hydrate. These are often disadvantageous and deleterious, due to the fact highly colored rare earth metal impurities form in the hydrate and an off-color pigment product results. Furthermore, if any iron is present in the solution, it precipitates also, and an additional redissolving step is required to offset the contaminating effects which the presence of iron in the pigment otherwise induces.

I have found that these as well as other advantages in previously existing processes for accelerating the hydrolysis of titanium salt solutions can be effectively and readily overcome. Accordingly, it is among the particular objects of my invention to provide a novel method for preparing an especially effective and highly useful type of nuclei or seeding material useful in titanium liquor hydrolysis and which inherently functions therein as both an accelerator and nucleating agent. Additional objects include the provision of a novel type of hydrolyzing process, wherein hydrolysis of titanium salt solutions to substantial completion and without requiring long hours of boiling is effected; to provide a process from which increased yields and in excess of substantially 95% of titanium oxide inherently result, and one which affords a ready and effective control over the particle size and other pigment characteristics of the titanium oxide produced. Other objects include: provision of an efficient method for producing relatively pure titanium oxide pigment, of controlled texture and particle size characteristics, of high hiding power, excellent color and opacity as well as undertone.

These and other objects are attainable in this invention which embodies the discovery that if known and controlled amounts of colloidal titanium hydrate per given weight of soluble titanium are initially and quickly formed in a hydrolyzing solution and the whole of said nuclei permitted to mature or condition for a definite period of time and at, preferably, a relatively constant hydrogen ion concentration, rapid and substantially complete dispersion of said nuclei and to ultramicroscopic dimension results when the same are admixed with a titanium liquor to be hydrolyzed.

My further discovery is that control over production of a high quality titanium oxide pigment results when known amounts of said conditioned nuclei are employed in a hydrolysis and caused to be rapidly admixed with the titanium solution to be hydrolyzed; that, as a result, a greater number of nuclei become quickly and uniformly dispersed throughout said solution, to form smaller titanium hydrate particles of more uniform radius on completion of hydrolysis and consequent production of a uniform particle size pigment which also possesses other desired and controlled pigment attributes.

In its broader aspects, therefore, my invention comprises intimately mixing and under such conditions as to effect substantially immediate and complete precipitation of titanium hydrate, a definite and known amount of a titanium salt solution with a known volume of hydrolyzing liquor, maturing or conditioning the resultant precipitate, inducing relatively complete and rapid dispersion of said precipitate by mixing a further and larger quantity of titanium salt solution therewith, and then subjecting the resultant mixture to hydrolysis.

In a more specific and preferred embodiment, the invention comprises initially adding a definite and known proportion of a titanium salt solution, such as titanium sulfate, to a known volume of hot hydrolyzing liquor, such as water, aging or conditioning the resultant precipitate at a controlled hydrogen ion concentration of about 1.2 for a relatively short period of time, then rapidly and completely dispersing the resultant colloidal nuclei to ultramicroscopic dimension by rapidly adding a further and much larger quantity of titanium solution to the hydrolyzing liquor, and then subjecting the mixture to hydrolysis at an elevated temperature.

In practically adapting the invention, relatively dilute or concentrated titanium salt solutions may be employed. Preferably, a relatively small but known amount of the titanium solution is added to a known, relatively large volume of the hydrolyzing diluent, such as water, both being preferably maintained at a temperature of about 90° C. during such admixture. The resultant precipitate is then digested, matured or conditioned in the mother liquor and for a period of not less than about 10 seconds. During such aging, the mother liquor is preferably maintained at a relatively constant hydrogen ion concentration of about 1.2 pH. As a result, a hydrolytically produced, non-colloidal, separable nuclei suspension capable of redispersion to uniform colloidal and nucleating properties forms. Upon attainment of desired conditioning, complete and rapid dispersion of the nuclei in the diluent is effected through addition thereto, preferably as rapidly as possible, of a greater, large quantity of titanium solution. After such subsequent addition, the temperature of the mixture is raised gradually to the boiling point and there maintained until hydrolysis becomes complete within a relatively short period of time. The hydrolysis product, titanium hydrate, is removed from the hydrolysis liquor through decantation or otherwise, and is then filtered, washed to effect acid removal, and then dried. The crude pigment product which is recovered is subjected to calcination in a conventional type of apparatus, such as a rotary calciner, at a temperature in excess of about 900° C., and preferably within the range of, say, from about 950° C. to 1000° C. After calcination, the pigment is subjected to conventional dry or wet grinding and thereby rendered ready for use. The finished product will consist of titanium oxide in a very high state of purity, relatively small and uniform in particle size, will be of excellent texture, color and whiteness and possess high tinting strength, hiding power and opacity.

In order that the invention may be more clearly understood, the following illustrative examples are given, but only by way of illustration and not in limitation of the invention:

*Example I*

A concentrated titanium solution containing 252 grams of $TiO_2$ per liter, 82 grams of iron, 1 gram of $Ti_2O_3$, and 670 grams of $H_2SO_4$ per liter was heated to 90° C. 90 cc. of this solution were added as rapidly as possible, and within 2 seconds, to 4300 cubic centimeters of water previously heated to a temperature of 90° C. The precipitate formed by combining the two liquids was allowed to age for a period of twenty-five seconds, after which an additional 13,000 cc. of the titanium solution was introduced, this second addition being accomplished within 13 seconds. The temperature of the solution was then gradually raised to the boiling point and there maintained for a period of five hours. After the first hour of boiling, a visible precipitate appeared, and the slurry subsequently became increasingly viscous. After completion of hydrolysis, the liquor containing iron and acid was readily removed by filtration from the precipitated titanium hydrate. Upon analysis, it was found that 95.55% of the titanium available in the original solution had been hydrolyzed. The titanium hydrate recovered was then washed thoroughly and calcined in a muffle furnace at a temperature of 950° C. A pigment of consistently uniform particle size and clear white color resulted.

*Example II*

A titanium solution having the same composition as that in Example I was heated to 90° C. Approximately 130 cubic centimeters of this solution were added rapidly and within 2 seconds to 4300 cubic centimeters of water at 90° C. After an aging period of 28 seconds, the precipitate formed on the combination of the two liquids was uniformly dispersed by adding rapidly, and within 18 seconds, an additional 13,000 cc. of titanium solution. The slurry was then brought to the boiling temperature and boiled for five hours, to effect titanium hydrate precipitation. Analysis of the mother liquor disclosed that 95.93% of the titanium had been precipitated. The titanium hydrate was recovered by filtration, given a thorough washing, and then calcined in a muffle furnace at a temperature of 950° C. On test, the pigments were found to be consistently uniform in particle size, of a clear, white color, of neutral tint, and exhibited excellent hiding power.

*Example III*

A relatively dilute titanium solution containing 190 grams of $TiO_2$ per liter, 62 grams of Fe, 1 gram of $Ti_2O_3$, and 510 grams of $H_2SO_4$ per liter was heated to 90° C. 130 cubic centimeters of this solution were added as rapidly as possible and within 2 seconds to 3000 cc. of water at 90° C. As soon as the two liquids were thoroughly mixed, agitation of the slurry was suspended and the precipitated titanium hydrate allowed to age, cool and settle. Within a few minutes it was possible to remove 2500 cc. of the supernatant solution of iron and acid, leaving a slurry of high titanium hydrate content. The period of aging and decantation in this instance consumed about 10 minutes' time. To this precipitate 13,000 cc. of the titanium solution was added rapidly (within 40 seconds) and dispersion of the hydrate to ultramicroscopic dimensions effected. The solution was then brought to a boil and maintained at that temperature for five hours. A $TiO_2$ yield in excess of 95% resulted. The product, when filtered, thoroughly washed and calcined, exhibited a better color and more distinct blue undertone when mixed with carbon black than a pigment made from similar titanium liquor by prior processes.

*Example IV*

A titanium solution having substantially the same characteristics as in Example I was heated to 90° C. 40 cubic centimeters of this solution were added rapidly (within 2 seconds) to 4300 cubic centimeters of water at 90° C. The flocculant precipitate which appeared was allowed to age for fifteen seconds, after which the solution was acidified and the precipitate dispersed by the addition of 250 grams of sulfuric acid. Immediately thereafter 13,000 cc. of the titanium solution were added rapidly to the colloidal solution of titanium hydrate. The period of aging and second addition of solution consumed in this instance was ten minutes. After a boiling period of five hours, it was found that over 95% of the available titanium had been hydrolyzed. The pigment, when thoroughly washed and calcined, was shown to be of relatively large, uniform particle size.

*Example V*

A relatively concentrated titanium solution containing 252 grams of $TiO_2$, 75 grams of Fe, 660 grams of $H_2SO_4$ per liter was heated to 90° C. 40 cc. of this solution were added quickly to 5600 cc. of water also maintained at a temperature of 90° C. The flocculant precipitate formed by the combination of the liquids was allowed to age for thirty seconds, after which 13,000 cc. of an additional amount of the titanium solution was introduced. The second addition was accomplished in ten seconds, and the original precipitate was dispersed substantially immediately so that the mixture appeared clear. The temperature of the solution was then raised to the boiling point, boiling being continued for five hours. A permanent precipitate appeared in the solution after the first hour. At the conclusion of the hydrolysis operation, the mother liquor containing the dissolved iron and acid was readily removed by filtration, and it was found upon analysis that over 95% of the titanium had been precipitated.

The titanium hydrate obtained as described above was thoroughly washed and calcined in a furnace at a temperature of 1000° C. Tests showed that the resulting pigment was of clear white color, possessed excellent hiding power, and was of very soft texture which dispersed readily in an oil vehicle.

*Example VI*

A relatively concentrated titanium solution containing 330 grams of $TiO_2$, and 685 grams of $H_2SO_4$ per liter was heated to 90° C. 90 cc. of this solution were added rapidly to 4300 cc. of water also at a temperature of 90° C. The flocculant precipitate which formed was allowed to age for twenty seconds, after which 13,000 cc. of the titanium solution were added as rapidly as possible. The entire operation was accomplished in less than one minute. The titanium solution containing the dispersed titanium hydrate was then heated to the boiling temperature, and boiled for a period of five hours. After heating for an hour a permanent white precipitate appeared. At the conclusion of the hydrolysis operation the precipitated titania was separated from the acid, and it was found upon analysis that over 95% of the available titania had been precipitated.

The titanium hydrate thus prepared was calcined in a furnace at a temperature of 1000° C. The resulting pigment when properly and conventionally ground displayed excellent properties.

*Example VII*

A relatively concentrated titanium solution containing 300 grams of $TiO_2$ per liter, 58 grams of Fe, and 670 grams of $H_2SO_4$ was obtained by attacking ilmenite with concentrated sulphuric acid. 13,000 cc. of this solution were heated to ninety degrees centigrade and a 90 cc. portion withdrawn and added rapidly to 4300 cc. of water also at a temperature of 90° C. A white flocculent precipitate appeared when the liquids were mixed, and this was allowed to age for a period of thirty seconds. The remaining bulk of the titanium solution was then quickly added to the suspension and the whole brought up to the boiling temperature. The original precipitate dispersed when the large volume of solution was added, but within an hour's time a permanent white precipitate appeared in the mixture. The solution was boiled for a period of five hours, after which the precipitated titania was separated from the mother liquor by filtration. A yield in excess of 95% was obtained.

After thoroughly washing the titania with water, it was subjected to calcination at a temperature in excess of 900° C. After proper grinding the pigment was found to possess a clear white color, high covering power, and good texture.

*Example VIII*

A relatively dilute titanium solution was obtained by attacking ilmenite with sulphuric acid. After proper clarification and removal of a portion of the iron by crystallization, the solution was analyzed as follows:

|  | Grams/liter |
|---|---|
| $TiO_2$ | 190 |
| Fe | 58 |
| $H_2SO_4$ | 496 |
| $Ti_2O_3$ | 1 |

155 cc. of this solution were then rapidly added to 7650 cc. of water previously brought to a temperature of 90° C. A white flocculent precipitate appeared when the liquids were mixed. The temperature of the suspension was maintained at 90° C. for a period of 5 minutes after which the temperature was rapidly lowered to 30° C. In order to facilitate the removal of the large excess of water from the suspension, 10 cc. of a glue solution containing 100 gm./l. were added. The large coagulated flocs settled rapidly to the bottom leaving a clear supernatant solution of iron and acid. The water was then decanted from the titanium hydrate, and this active material retained as an accelerating and nucleating agent for the hydrolysis of titanium salt solutions.

Twenty-six liters of the titanium solution described above were heated to 90° C. The titanium hydrate nucleating agent described above was then added and the heating continued at a rate of a half degree per minute until the boiling point was reached. After one hour had elapsed a permanent precipitate appeared in the solution which up to this time had been perfectly clear. The boiling was continued for a period of five hours. At the end of this time the precipitated titania was removed from the mother liquor by filtration and washing. Upon analysis it was found that a yield of 94.8% was obtained. The titania when calcined in a furnace at a temperature of 1000° C. displayed excellent pigment properties.

*Example IX*

A titanium hydrate accelerating and nucleating agent was prepared from a relatively dilute titanium solution in a manner similar to that employed in the preceding example. The suspension contained 100 grams per liter of $TiO_2$, after the supernatant water had been removed. 1370 cc. of this suspension were quickly added to 18 liters of a titanium-iron solution containing 190 grams per liter of $TiO_2$, 58 grams of Fe, 1 gram of $Ti_2O_3$, and 496 grams of $H_2SO_4$ per liter, which had previously been heated to 90° C. The hydrolysis procedure in this case was similar to that used in Example VIII, but in this case the amount of accelerating agent used was 4% on a $TiO_2$ basis whereas in said former example only 0.5% was used. The use of more accelerating agent promotes the formation of a larger number of small particles which in some applications is very desirable.

In addition to obtaining a yield in excess of 95% it was found that filtration of this titania was much more readily accomplished than in other processes. The purified material when calcined and ground was found to possess good color, excellent undertone when mixed with dark pigments, and excellent texture when made into a paint.

*Example X*

A concentrated titanium solution of the following characteristics: $TiO_2$, 307 grams per liter; Fe, 52 grams/liter; $Ti_2O_3$, 4 grams/liter; and $H_2SO_4$, 497 grams/liter, was obtained through sulfuric acid attack on ilmenite. The free acid (over the amount required to form normal salts with the iron and the basic sulfate of titanium) was lower than usual commercial practice. 100 cc. of this solution were added as quickly as possible to 5000 cc. of water at 90° C. The resultant white, flocculent precipitate of titanium hydrate was allowed to age for 45 seconds in slightly acid medium after which the suspension was cooled to room temperature. A 10 cc. portion of a solution containing 100 grams/liter of glue was then added to settle out the suspended material. The supernatant liquid containing iron and acid was decanted and the excess still remaining removed by filtering. The main portion of titanium liquor comprising a volume of ten liters was heated to 90° C. At this point the preprecipitated titanium hydrate was incorporated into the liquor and the mixture brought to the boiling point within a period of one hour. After fifty minutes of heating the solution became increasingly viscous and a permanent precipitate of $TiO_2$ appeared. A five-hour boil resulted in a yield in excess of 95%. The precipitated $TiO_2$ was separated from the mother liquor, washed and calcined. The resulting pigment was of pure white tint and possessed excellent tinting strength.

While specific volumes and ratios of diluent to titanium liquor at specific titanium and acid concentration have been employed in the foregoing examples, the invention is not limited thereto, nor to the temperatures or nuclei aging periods mentioned.

The benefits arising under the invention are coupled with substantial economies when applied to the hydrolysis of all types of titanium liquors and whether concentrated or dilute. When utilized in the hydrolysis of dilute solutions, it will be found particularly advantageous due to the fact that the costly concentration step prior to hydrolysis may be avoided. In such instances, also, wide variations in technique are permissible, which in turn makes it possible to alter the physical properties of the pigment as desired. By "concentrated" titanium solutions, I refer to those liquors which range in excess of substantially 200 grams of $TiO_2$ per liter, and usually within the range of about 225 to 260 grams per liter. In commercial practice, $TiO_2$ concentrations are limited to those whose viscosity will permit ease of handling, clarification, filtration, etc. When no iron or substantially unappreciable quantities thereof are present in the liquor, the $TiO_2$ concentration thereof may be increased up to and in excess of substantially 300 grams per liter. Should less acid be present in the solution, i. e., a lower factor of acidity exist, either the $TiO_2$ or iron may be increased, as desired. Dilute solutions, on the other hand, connotes those from which water has not been deliberately removed in a separate operation, and includes those wherein the $TiO_2$ concentration does not exceed substantially 200 grams per liter, but usually ranges downward from this figure to about 180 grams per liter, or lower.

Although generally my invention embraces a process wherein substantially rapid but intermittent introduction or admixture of a solution of a titanium salt (a sulfate, tetrachloride, etc.) with a diluent is effected and an intervening nuclei aging or maturing period is provided of sufficient duration to permit the initially-formed, separable, non-colloidal nuclei to condition to proper nucleating properties and become capable of substantially complete and immediate dispersion to uniform colloidal size and ultra-microscopic dimension when subsequently mixed with additional and preferably larger quantities of titanium solution, certain operating factors are preferably observed in order that optimum benefits may be procured herein. For instance, initial formation of the separable nuclei and subsequent dispersion of the same to uniform colloidal phase is usually effected by quick and substantially immediate admixture of the titanium liquor with the diluent. Preferably, liquor mixing is effected through addition of the titanium solution to the hydrolyzing diluent or solution of lesser concentration; or such liquors may be concurrently run together into a reaction vessel, or mechanical or other agitation means resorted to for purposes of promoting such desired quick mixing. While addition of the titanium liquor to the diluent comprises a preferred method of procedure, the reverse operation may also be employed, since effective separable nuclei are also obtainable by rapidly adding water to a titanium liquor and in substantially the proportions illustrated. Such suspension may then be incorporated into the main body of liquor and the whole brought to boiling to effect precipitation of titanium.

The mixing rates and aging times which are desirably employable in the invention will depend somewhat upon liquor temperatures, volume ratios, final $TiO_2$ concentrations, etc. Preferably, the titanium liquor and diluent being mixed are maintained at an elevated temperature ranging from about 90° C. to about 100° C. Temperatures of a lower order and ranging down to, say, about 60° C. may also be employed. In the latter instances, however, it will be found desirable to resort to longer nuclei aging periods. While pure water comprises a preferred useful type of diluent in the invention, wash water or liquors relatively low in titanium concentration, and/or obtained from other steps of the titanium oxide producing operation may be employed, if desired.

Preparation of the hydrolyzing liquor is preferably effected by first quickly adding a known, relatively small volume of titanium liquor to a known but relatively larger volume of hot diluent. Subsequently, a known but much larger volume of titanium liquor is quickly added to the diluent containing the non-colloidal nuclei. Sufficient time is allowed to lapse in the interim between intermittent additions to permit said nuclei to develop or mature to proper nucleating characteristics.

The fluid volumes initially employable for production of the non-colloidal nuclei will be dependent upon the amount of nuclei to be developed or which are to be ultimately dispersed as the seeding medium in the liquor to be hydrolyzed. This amount, in turn, depends upon the characteristics, and especially particle size, desired in the final pigment. As stated, white titanium oxide pigments, must in addition to other properties exhibit a pure neutral tint and satisfactory particle size. Having a wide field of application, their particle size requirements are often quite different. For instance, when compounded with a dark substance, such as rubber, a blue undertone should desirably show up. Relatively small particle size pigments best achieve this effect. Pigments of relatively large particle size, however, are better adapted for use in vehicles employed as coating compositions, such as paints or enamels. Since the number and size of the pigment particles is in a large measure determined by the number of nuclei used to accelerate the reaction, it will be found that an efficient means is afforded by my process through which adequate control over nucleation is easily had and ready production effected of controlled uniform particle size pigments. When a relatively small amount of titanium hydrate is used as a seeding catalyst, it will be found that the ultimate size of the pigment particles will be relatively large, whereas if relatively large quantities of hydrate are employed, production of a pigment relatively small in particle size results.

As stated, the volumes and concentrations of the fluids employed regulate and control the quantity of hydrate obtained. I have found it convenient and therefore preferably employ such quantities as will provide a $TiO_2$ concentration of nuclei in the solution to be hydrolyzed of from about 3 to 4 g./l. While such concentrations are preferred, concentrations ranging from about 1 to about 10 g./l. and depending upon the acidity factor of the hydrolyzable solution may also be employed. When using dilute or concentrated titanium solutions, I prefer to effect production of the separable nuclei by admixing a diluent, such as water, while hot, with from about .3% to about 2% of the liquor to be hydrolyzed. The volume ratio of liquor to diluent so admixed is variable, but preferably an amount of diluent ranging from about 20 to 80 times the liquor is employed. Lesser or greater proportions of such diluent and depending upon liquor $TiO_2$ concentration may be used. Thus, the diluent volumes may range to as low as 10-15 or as high as about 250 times the volume of the liquor. Similarly, while use of from about .3% to 2% of titanium liquor is preferred for producing the initial nuclei, lower or higher proportions may also be employed. Thus an amount of titanium liquor ranging to as low as about .2% and as high as about 5% of the hydrolyzable solution may be used, if desired. In certain instances, the latter range may be exceeded to embrace, say, from about 0.1% to 10%. Generally, however, I prefer to operate within the specified lower ranges.

These ranges are particularly useful in the hydrolysis of dilute solutions and wherein approximately 80 to 90% of the water present is preferably removed prior to hydrolysis through decantation and while such solution is in more or less quiescent state. The amount of water to be removed will depend upon the concentration of $TiO_2$ desired during hydrolysis. Such concentration may range within, say, 170 to 200 g./l. and usually from about 180 to 185 g./l. When hydrolyzing relatively concentrated titanium solutions, I have found it preferable to resort to hydrate percentages not exceeding substantially 1% and not below, say, substantially .7%. In general, pigments obtained from relatively low seeding operations are of somewhat softer texture, while those from higher nucleations are more crisp in character. When a seeding level of about 1.5% upwards is resorted to, very crisp, calcined pigments will be found to usually result.

When resorting to my preferred and so-called continuous type of operation, I have found it desirable to take an amount of titanium solution approximating, say, about 1% of the total titanium liquor to be hydrolyzed and quickly add the same to the hydrolyzing solution, thereby initially effecting precipitation of the separable nuclei. The time consumed by such step will obviously depend upon the amount of solution added, although in most instances, the time so consumed does not substantially exceed a few seconds. The non-colloidal nuclei are then allowed to age or mature and for a definite period of time, preferably not less than, say, about 10 seconds, such aging being preferably effected in the mother liquor and while the latter is maintained at a relatively high acidic factor, i. e., below a pH of about 2.5 and usually of the order of about 1.2. While such an acidity is desirable, preferably the pH value should not fall below about 1.0, since possible redispersion of the nuclei might otherwise occur should the acid condition rise too high. After sufficient aging or conditioning of nuclei, the remaining portion of said titanium solution is then quickly added to said nuclei-containing diluent. Such remainder being in larger quantity, more time will be consumed than in making the initial addition. Ordinarily however, this subsequent addition need not consume more than a few minutes' time. For the procurance of optimum benefits, I have found that a satisfactory operation comprises one in which the total time consumed by such intermittent liquor additions is less than about 1 minute and does not exceed, say, about 2 minutes, with allowance of an additional time interval of about 30 seconds to permit the non-colloidal precipitate to age in its mother liquor. While time consumptions such as these comprise those resorted to in preferred adaptations of the examples, suitable enlargements of said times may be resorted to and to comprehend, say, a total period of about 3, but preferably not to exceed about 4 minutes for such liquor additions and aging periods. While to a restricted extent the total times consumed in effecting liquor additions and aging may be enlarged, no definitely appreciable benefits arise therefrom and accordingly further time enlargements are not recommended. The maximum times to be consumed will depend largely upon the temperatures and concentrations of the involved solution, as will the time period for aging or conditioning the separable nuclei. Thus, in instances where the solutions are maintained at about 90° C., it will be found that the maximum time consumed in effecting the first or initial addition of titanium liquor to diluent should never exceed about 10 minutes, nor should an amount of time in excess of about 16–20 minutes be utilized in effecting the subsequent additions of concentrate, depending upon the final TiO₂ concentration of the liquors. Should these times be exceeded, early precipitation of an off-color pigment will result in the hydrolysis. Likewise, the time required to age the precipitate varies with the composition of the solution and the temperature of formation. While not absolutely critical, it will be generally found that the time interval between additions of liquor to diluent should preferably range from not less than about 10 seconds and not in excess of about 5 minutes. When utilizing solutions maintained at the preferred temperature of about 90° C., the nuclei conditioning period should never exceed about 10–15 minutes, because if extended too far, the pigment product obtained will be objectionably softer and considerably lower in tinting strength.

The following table illustrates certain desirable operating limits for the production of a suitable separable nuclei from a relatively dilute titanium solution having the following approximate composition: TiO₂, 190 grams/liter; Fe, 60 grams/liter; H₂SO₄, 500 grams/liter.

| Temp., °C. | Lowest ratio of diluent liquor | Aging time in minutes | | Optimum ratio | Optimum aging |
| --- | --- | --- | --- | --- | --- |
| | | Maximum | Minimum | | |
| | | | | | Minutes |
| 100 | 20/1 | 2 | | 40/1 | 1 |
| 90 | 30/1 | 15 | 2 | 50/1 | 5 |
| 80 | 50/1 | 40 | 7 | 70/1 | 12 |
| 70 | 80/1 | 120 | 20 | 100/1 | 60 |

Obviously, when employing other titanium solutions but of a substantially similar nature, slight variations will be incurred for solutions of greater or lesser free acid content.

During aging of the non-colloidal precipitate, it will be found preferable to have little or no soluble titanium present in the hydrolysis solution. In dilute solutions and in the presence of the surfaces of the precipitate, hydrolysis will continue during the aging period and cement the particles in such a way as to hinder or prevent immediate and complete dispersion. Where formation of a precipitated nucleating agent is accomplished by the gradual and continuous addition of liquor to hot water, precipitation occurs over an extended period and therefore the danger of cementation is always imminent. As a consequence, a variation in the properties of the nuclei is to be expected because obviously that portion precipitated early in the process will be aged for a relatively long period prior to dispersion, whereas other nuclei will disperse almost immediately after precipitation.

Furthermore, and as already indicated, the brightness of the final pigment TiO₂ is generally proportional to the concentration of the titanium in solution at the time of hydrolysis. In prior processes wherein the reaction is accelerated through a slow, continuous and uniform addition of the titanium solution to the diluent to form colloidally dispersed nuclei, an appreciable amount of titania is deposited upon the active centers during the introduction (consuming some 15 to 20 minutes). The initial deposit will therefore contain relatively large amounts of impurities. Through the use of the instant rapid, intermittent and nuclei aging technique, the time necessary to reach the final concentration is substantially negligible, and all subsequent precipitation is effected under conditions which are known to be highly conducive to good color. Similarly, in making use of the separable nuclei, the net overall dilution can be kept at an absolute minimum, thereby insuring against precipitation of undesirable and contaminating impurities. As a consequence, in addition to affording a desirable control over the ultimate particles size characteristics which the pigment will exhibit, my process also affords the production of a titanium oxide pigment of maximum opacity, of clear, excellent white color, of neutral tint, and possessed of high hiding power and strength.

As indicated, the invention is adaptable for hydrolyzing either concentrated or dilute titanium solutions, and whether in such hydrolysis the nuclei is formed within or extraneous of the hydrolyzing solutions. When dilute solutions are employed, precipitation and conditioning of nuclei is effected in substantially the same manner as that of concentrated solutions, following which the seed-containing slurry is allowed to cool and settle, the supernatant liquor being preferably removed from the precipitate by decantation or filtration. Obviously, when either dilute or concentrated solutions are restored to, initially a separable nuclei suspension results and this is essentially free from alkali or alkaline earth metal compounds. After suitable conditioning through aging, said nuclei becomes readily adapted to redispersion to uniform colloidal phase and nucleating properties in the presence of further and larger quantities of titanium liquors, particularly when the latter are rapidly added to the nuclei-containing diluent. Whatever type or character of titanium solution is employed, dispersion of the separable hydrate to ultramicroscopic dimension is preferably effected by adding the remaining and larger volume of titanium liquor with as much rapidity as possible to said conditioned nuclei, hydrolysis being then effected in the usual and customary manner. Where dilute solutions are resorted to, the initially precipitated nuclei may be, if desired, centrifuged off and then subsequently added to a titanium solution to be hydrolyzed. Preferably, however, I resort to a continuous type of operation, i. e., the initial precipitation of the separable nuclei and its subsequent redispersion to colloidal phase through rapid addition of further and larger quantities of a titanium salt solution.

As will be apparent, although the invention is concerned with the preparation and introduction of hydrolysis accelerators comprising titanium hydrate, it distinguishes from prior processes by the method of producing and dispersing the accelerator or nucleating agent. Thus, it will be found that formation and dispersion of titanium hydrate to colloidal dimensions serves two distinct purposes, namely, (1) the acceleration of the chemical reaction by exposing large areas of catalytically active surfaces, and (2) the control of particle size. The catalytic activity of a given weight of hydrate is dependent upon the degree of subdivision and the physical character of the surface. The dispersibility and surface characteristics are altered by the composition and temperature of the surrounding media, the rate of addition of reactants, as well as the length of the aging period. Also, the greater the number of nuclei, the smaller will be the radius of the individual particles after hydrolysis is complete. This relationship of particle size to nucleation is apparent when it is considered that each dispersed unit of colloidal hydrate acts as a center around and upon which hydrolysis takes place. The units increase in size until the amount of available soluble titanium in the mixture becomes exhausted. Thus, while the initial precipitate of titanium hydrate is being aged, there should preferably be little or no soluble titanium present. Flocculation of these primary particles to give a readily filtered precipitate occurs, but in an optical system it will be found that it is the size of the primary units that is of importance. In order to insure uniformity throughout the large number of nuclei, they must be precipitated at as near the same moment as possible, since by so doing, the surface characteristics of all of the particles will be identical and the subsequent growth of additional layers of hydrate by hydrolysis will occur at equal rates, with more uniform particle size as a result. This is what I accomplish in my present invention.

In prior processes, on the other hand, it is the titanium-acid solution which effects dispersion of the titanium hydrate. In such processes the addition of solution must occur at a relatively slow continuous rate, and as a consequence, the necessary dispersing action is not at a maximum, as here, when most needed. Hydrolysis takes place upon the partially dispersed colloid, making it difficult to obtain further subdivision later on. Therefore, in such processes precipitation occurs over an extended period before the solution becomes sufficiently acid to effect dispersion of the titanium hydrate. Cementation is always imminent and a variation in the properties of the nuclei is consequently unavoidable because that portion which is precipitated early in the process becomes aged for a longer period before dispersing, whereas other nuclei will disperse almost immediately after precipitation. The advantages which the instant rapid and intermittent addition process afford are obvious. The acid strength of the final mixture is attained so rapidly that the formation of new nuclei is prevented and the dispersing action is at a maximum when most needed. Complete breakdown of the hydrate to colloidal dimension is thereby assured.

It will be obvious that the invention affords a much more flexible method of obtaining satisfactory pigment from titanium liquors, which pigments will be of controlled particle size and desired blue undertone. It obviates the necessity of resorting to calibrated orifices which are required for adding titanium liquors in prior hydrolyses processes, and eliminates the danger of spoilage occurring therein when undesired fluctuations in the introduction of titanium liquors occur. Furthermore, valuable savings in evaporation costs, either on solution before hydrolysis or on waste acid after hydrolysis, are desirably effected, and this occurs without resort to expensive chemicals which must be employed in prior hydrolyses to effect such results.

I claim as my invention:

1. A process for hydrolyzing a titanium sulfate solution comprising initially quickly adding the whole of a .3% to 2% portion of the total sulfate solution to be hydrolyzed to a volume of hot diluent ranging in amount from 20 to 80 times the volume of said .3% to 2% amount of titanium sulfate solution so admixed therewith to form non-colloidal nuclei therein, withholding addition of the remainder of said solution to said diluent for a period of at least 10 seconds while said separable nuclei age and condition at a pH value of about 2.5 to 1 for subsequent rapid dispersion to uniform colloidal phase and nucleating characteristics, thereupon quickly adding said remainder portion of said titanium sulfate solution to the nuclei-containing diluent, and then hydrolyzing the mixture at an elevated temperature.

2. The process of claim 1 in which the time consumed in effecting titanium liquor additions and nuclei aging is not in excess of substantially 4 minutes.

3. The process of claim 1 in which the titanium solution comprises titanium sulfate and the time consumed in effecting titanium liquor additions and nuclei aging is not in excess of substantially 2 minutes and 30 seconds.

4. A process for hydrolyzing a titanium sulfate solution comprising initially quickly adding from about .3% to 2% of the total titanium sulfate solution to be hydrolyzed to a volume of hot water ranging in amount from about 20 to 80 times the volume of said .3% to 2% portion of titanium liquor to form separable non-colloidal nuclei therein, aging the separable nuclei precipitate in its mother liquor and at a constant hydrogen ion concentration ranging from a pH of about 2.5 to 1 for a period of at least 10 seconds, thereupon quickly adding the remainder of said titanium sulfate solution to be hydrolyzed to the nuclei-containing hot water whereby said nuclei become rapidly dispersed to uniform colloidal phase and nucleating characteristics, and then hydrolyzing the resulting mixture at an elevated temperature.

5. A process for hydrolytically precipitating titanium oxide comprising quickly adding a small amount of a hot titanium sulfate solution, comprising from about .3% to 2% of the total amount of titanium solution to be hydrolyzed, to hot water, the amount of the latter ranging from about 20 to 80 times the volume of said .3% to 2% of titanium solution, permitting the precipitated non-colloidal nuclei which forms as a result of said admixture to mature for a period of not less than 10 seconds in its mother liquor at a constant hydrogen ion concentration of about 1.2 pH, thereafter rapidly dispersing said precipitate to substantially uniform, colloidal dimension in the remaining portion of the titanium sulfate solution to be hydrolyzed by quickly mixing said remaining portion with said nuclei-containing mother liquor, and then hydrolyzing the resulting mixture at an elevated temperature.

CARL M. OLSON.